(12) United States Patent
Cohen et al.

(10) Patent No.: US 10,127,304 B1
(45) Date of Patent: *Nov. 13, 2018

(54) ANALYSIS AND VISUALIZATION TOOL WITH COMBINED PROCESSING OF STRUCTURED AND UNSTRUCTURED SERVICE EVENT DATA

(71) Applicant: EMC Corporation, Hopkinton, MA (US)

(72) Inventors: Raphael Cohen, Beer-Sheva (IL); Alon J. Grubshtein, Lehavim (IL); Peter R. Elliot, Kinsale (IE); Aisling J. Crowley, Ballincollig (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 706 days.

This patent is subject to a terminal disclaimer.

(21) Appl. No.: 14/670,810

(22) Filed: Mar. 27, 2015

(51) Int. Cl.
*G06F 17/30* (2006.01)

(52) U.S. Cl.
CPC .. *G06F 17/30601* (2013.01); *G06F 17/30864* (2013.01)

(58) Field of Classification Search
CPC . G06N 5/04; G06F 17/2735; G06F 17/30613; G06F 17/30731
See application file for complete search history.

(56) References Cited

U.S. PATENT DOCUMENTS

| | | | |
|---|---|---|---|
| 7,765,212 B2 | 7/2010 | Surendran et al. | |
| 7,912,847 B2 | 3/2011 | Lagad et al. | |
| 8,396,741 B2 | 3/2013 | Kannan et al. | |
| 8,458,115 B2 | 6/2013 | Cai et al. | |
| 8,543,563 B1 * | 9/2013 | Nikoulina | G06F 17/2809 704/2 |
| 8,645,395 B2 | 2/2014 | Mushtaq et al. | |

(Continued)

OTHER PUBLICATIONS

J. Chuang et al., "Termite: Visualization Techniques for Assessing Textual Topic Models," Proceedings of the ACM International Working Conference on Advanced Visual Interfaces (AVI), May 2012, pp. 74-77, Capri Island, Naples, Italy.

(Continued)

*Primary Examiner* — Dinku W Gebresenbet
(74) *Attorney, Agent, or Firm* — Ryan, Mason & Lewis, LLP

(57) ABSTRACT

An apparatus comprises a processing platform configured to implement an analysis and visualization tool for combined processing of structured and unstructured service event data. The structured service event data comprises service event data stored in one or more structured data fields of a service events database, and the unstructured service event data includes documents comprising unstructured text data of the service events database. The analysis and visualization tool is associated with a clustering module that assigns each of the documents to one or more clusters corresponding to respective topics. The analysis and visualization tool comprises an interface that permits selection of one or more of the structured data fields, and a visualization module configured to generate at least one visualization as a function of the selected one or more structured data fields and particular ones of the cluster topics that relate to the selected one or more structured data fields.

17 Claims, 11 Drawing Sheets

(56) References Cited

U.S. PATENT DOCUMENTS

| | | | |
|---|---|---|---|
| 8,719,302 B2 | 5/2014 | Bailey et al. | |
| 8,738,361 B2 | 5/2014 | Gryc et al. | |
| 2004/0103116 A1* | 5/2004 | Palanisamy | G06F 17/30569 |
| 2007/0244859 A1* | 10/2007 | Trippe | G06F 17/30401 |
| | | | 707/999.003 |
| 2009/0043797 A1 | 2/2009 | Dorie et al. | |
| 2010/0138282 A1* | 6/2010 | Kannan | G06Q 10/06398 |
| | | | 705/7.42 |
| 2011/0136542 A1 | 6/2011 | Sathish | |
| 2012/0233132 A1* | 9/2012 | Rajpathak | G06F 17/2795 |
| | | | 707/687 |
| 2013/0097167 A1 | 4/2013 | St. Jacques, Jr. et al. | |
| 2013/0211880 A1 | 8/2013 | Kannan et al. | |
| 2013/0311454 A1* | 11/2013 | Ezzat | G06F 17/30539 |
| | | | 707/722 |
| 2014/0101086 A1 | 4/2014 | Lu et al. | |
| 2015/0317389 A1* | 11/2015 | Hua | G06F 17/30705 |
| | | | 706/12 |
| 2015/0356571 A1* | 12/2015 | Chang | G06Q 30/0201 |
| | | | 705/7.29 |

OTHER PUBLICATIONS

R. Cohen et al., "Redundancy in Electronic Health Record Corpora: Analysis, Impact on Text Mining Performance and Mitigation Strategies," BMC Bioinformatics, Apr. 2013, pp. 1-15, vol. 14, No. 10.

R. Cohen, "Towards Understanding of Medical Hebrew," Thesis, Ben-Gurion University of the Negev, Nov. 2012, 127 pages.

D.M. Blei et al., "Latent Dirichlet Allocation," Journal of Machine Learning Research, Jan. 2003, pp. 993-1022, vol. 3.

A.K. McCallum, "Mallet: A Machine Learning for Language Toolkit," 2002, 2 pages.

H.M. Wallach et al., "Rethinking LDA: Why Priors Matter," Advances in Neural Information Processing Systems 22: 23rd Annual Conference on Neural Information Processing Systems, Dec. 2009, 9 pages, Vancouver, British Columbia, Canada.

P.F. Brown et al., "Class-Based n-gram Models of Natural Language," Association for Computation Linguistics, 1992, pp. 467-479, vol. 18, No. 4.

S. Banerjee et al., "The Design, Implementation and Use of the Ngram Statistics Package," Proceedings of the 4th International Conference on Computational Linguistics and Intelligent Text Processing (CICLing), 2003, pp. 370-381.

A. Nenkova et al., "The Impact of Frequency on Summarization," Microsoft Research, Tech. Rep. MSR-TR-2005-101, Jan. 2005, 8 pages.

H. Daumé III et al., "Bayesian Query-Focused Summarization," Proceedings of the 21st International Conference on Computational Linguistics and 44th Annual Meeting of the ACL, Jul. 2006, pp. 305-312, Sydney, Australia.

J.M. Conroy et al., "Classy Query-Based Multi-Document Summarization," Proceedings of the 2005 Document Understanding Workshop, Oct. 2005, 9 pages.

T. Baumel et al., "Query-Chain Focused Summarization," Proceedings of the 52nd Annual Meeting of the Association for Computational Linguistics, Jun. 2014, pp. 913-922, vol. 1.

G. Erkan et al., "LexRank: Graph-Based Lexical Centrality as Salience in Text Summarization," Journal of Artificial Intelligence Research, Dec. 2004, pp. 457-479, vol. 22.

U.S. Appl. No. 14/501,407, filed in the name of R. Cohen et al. on Sep. 30, 2014 and entitled "Automated Content Inference System for Unstructured Text Data."

U.S. Appl. No. 14/501,431, filed in the name of R. Cohen et al. on Sep. 30, 2014 and entitled "Cluster Labeling System for Documents Comprising Unstructured Text Data."

* cited by examiner

ANALYSIS AND VISUALIZATION TOOL WITH COMBINED PROCESSING OF STRUCTURED AND UNSTRUCTURED SERVICE EVENT DATA

FIELD

The field relates generally to information processing systems, and more particularly to analysis and visualization of data relating to service events.

BACKGROUND

In many information processing systems, service event analysis relies heavily on inefficient manual activities. For example, it is common in some systems for service personnel to be required to complete forms describing problems experienced by customers and the manner in which these problems were resolved. These forms often utilize static sets of predetermined problem and resolution codes that, in the interest of convenience to the service personnel, tend to be overly general and vague.

Supplementary unstructured text data added to such forms is often ignored as it requires special treatment. For example, the unstructured text data may require manual screening in which a corpus of unstructured text data is reviewed and sampled by service personnel. Alternatively, the unstructured text data may require manual customization and maintenance of a large set of rules that can be used to determine correspondence with predefined themes of interest. Such processing is unduly tedious and time-consuming, particularly for large volumes of unstructured text data.

SUMMARY

Illustrative embodiments of the present invention provide analysis and visualization tools for combined processing of both structured and unstructured service event data. For example, in some embodiments an analysis and visualization tool is configured to provide combined processing of structured service event data associated with predetermined structured data fields of a service events database and unstructured service event data comprising unstructured text data from the service events database.

In one embodiment, an apparatus comprises a processing platform configured to implement an analysis and visualization tool for combined processing of structured and unstructured service event data. The structured service event data comprises service event data stored in one or more structured data fields of a service events database, and the unstructured service event data includes documents comprising unstructured text data of the service events database. The analysis and visualization tool is associated with a clustering module configured to assign each of the documents to one or more of a plurality of clusters corresponding to respective topics. The analysis and visualization tool comprises an interface configured to permit selection of one or more of the structured data fields, and a visualization module configured to generate at least one visualization as a function of the selected one or more structured data fields and particular ones of the cluster topics that relate to the selected one or more structured data fields.

The unstructured text data in some embodiments illustratively comprises unstructured service request summaries. For example, the unstructured service request summaries may comprise problem summaries and corresponding solution summaries relating to respective service events.

The illustrative embodiments provide a number of significant advantages relative to the conventional arrangements described previously. For example, these embodiments avoid the need for manual screening in which a corpus of unstructured text data is reviewed and sampled by service personnel.

Moreover, the analysis and visualization tools in the illustrative embodiments are data driven in that relevant topics are elevated automatically from the actual unstructured text data itself rather than determined by attempting to impose a limited set of predefined themes on the unstructured text data. As a result, there is no need for manual customization and maintenance of a large set of rules that can be used to determine correspondence with predefined themes of interest. For example, the illustrative embodiments do not require rule updates to accommodate previously unseen terms appearing in unstructured text data.

In addition, analysis and visualization tools as disclosed herein can provide significant insights into relationships between structured and unstructured service event data in a very short period of time. Particular studies can be configured and executed quickly, with large quantities of analysis output being available almost immediately. Also, such studies can be easily reconfigured and repeated as needed using different sets of parameters.

These and other illustrative embodiments described herein include, without limitation, apparatus, systems, methods and processor-readable storage media.

BRIEF DESCRIPTION OF THE DRAWINGS

FIGS. 4 through 9 show examples of user interface displays generated by an analysis and visualization tool in illustrative embodiments.

DETAILED DESCRIPTION

Illustrative embodiments of the present invention will be described herein with reference to exemplary information processing systems and associated processing platforms each comprising one or more processing devices. It is to be appreciated, however, that the invention is not restricted to use with the particular illustrative system, platform and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
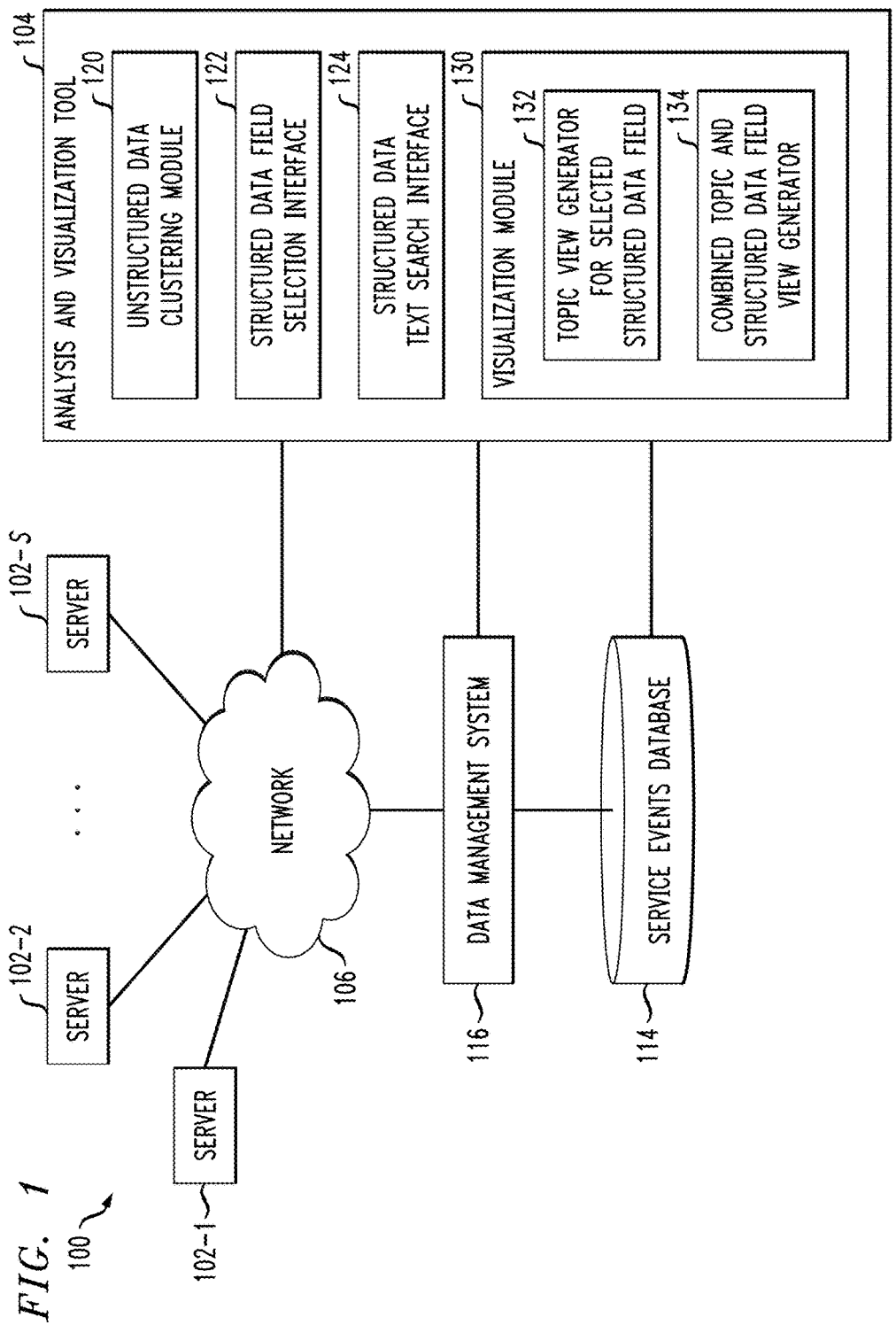
FIG. 1 is a block diagram of an information processing system that includes an analysis and visualization tool for structured and unstructured service event data in an illustrative embodiment of the invention.

FIG. 1 shows an information processing system 100 configured in accordance with an illustrative embodiment of the present invention. The information processing system 100 is assumed to be built on at least one processing platform and provides an analysis and visualization tool that in the present embodiment utilizes cluster labeling functionality. The cluster labeling functionality can be provided in conjunction with other types of related functionality, such as content inference functionality of a content inference system that incorporates or is otherwise associated with a cluster labeling system. A given analysis and visualization tool as disclosed herein may therefore be implemented as a portion of another system, such as a cluster labeling system or a content inference system.

The information processing system 100 in this embodiment illustratively comprises a plurality of servers 102-1, 102-2, . . . 102-S and an analysis and visualization tool 104, all of which are coupled to and communicate over a network 106. The analysis and visualization tool 104 is advantageously configured for combined processing of structured and unstructured service event data.

The analysis and visualization tool 104 is coupled to a service events database 114. The service events database 114 in the present embodiment is assumed to store both structured and unstructured service event data. It is to be appreciated that the service events database 114 may comprise a combination of multiple separate databases, such as separate databases for respective structured and unstructured service event data. Such multiple databases may be co-located within a given data center or other facility or geographically distributed over multiple distinct facilities. Numerous other combinations of multiple databases each containing portions of at least one of structured and unstructured service event data can be used in implementing the service events database 114.

The structured service event data illustratively comprises service event data stored in one or more structured data fields of the service events database 114, and the unstructured service event data illustratively includes documents comprising unstructured text data of the service events database 114. More particularly, the unstructured service event data in the present embodiment is assumed to comprise unstructured text data in the form of multiple documents each relating to one or more service events arising within the system 100 or within associated systems not explicitly shown.

By way of example, in an embodiment in which the system 100 is implemented by or on behalf of a customer-facing business such as a customer support organization, the structured and unstructured service event data can comprise large amounts of information regarding customer interaction. The structured service event data in this context may comprise structured information about the customer, support personnel involved in each case, locations, dates, times to resolution, product types and problem codes. The unstructured service event data in this context may comprise manual textual information entered by support engineers or help desk assistants. This may include a description of the problem (e.g., a problem summary or problem description), the steps taken to correct the problem (e.g., a resolution summary) or the entire customer interaction (e.g., chat or call transcripts). Numerous other types of structured and unstructured service event data can be used in other embodiments.

The service events database 114 illustratively comprises one or more storage disks, storage arrays, electronic memories or other types of memory, in any combination. Although shown as separate from the analysis and visualization tool 104 in FIG. 1, the service events database 114 in other embodiments can be at least partially incorporated within the analysis and visualization tool 104, or within one or more other system components.

The documents stored in the service events database 114 need not be in any particular format or formats, but generally comprise unstructured text data, possibly stored in combination with other types of data such as structured text data. Moreover, a given set of documents subject to processing in embodiments of the invention can illustratively include documents of a variety of different formats. The term "document" as used herein is therefore intended to be broadly construed.

In the present embodiment, the analysis and visualization tool 104 and the service events database 114 are associated with a data management system 116. The analysis and visualization tool 104 can communicate directly with the service events database 114 and the data management system 116, and additionally or alternatively can communicate with these system components via the network 106.

The data management system 116 coordinates storage of structured and unstructured service event data in the service events database 114, as well provision of portions of that data to the analysis and visualization tool 104 as needed for processing. It is also possible for the analysis and visualization tool 104 to provide data directly to, and retrieve data directly from, the service events database 114.

The analysis and visualization tool 104 in the present embodiment is separated into a plurality of functional modules, including an unstructured data clustering module 120, a structured data field selection interface 122, a structured data text search interface 124 and a visualization module 130.

The unstructured data clustering module 120 operates on unstructured service event data from the service events database 114. For example, the module 120 is illustratively configured to assign each of a plurality of documents of the unstructured service event data to one or more of a plurality of clusters corresponding to respective topics. The topics can be identified at least in part from the unstructured text data of those documents using at least one topic model provided by a topic model generator.

Although the clustering module 120 in the FIG. 1 embodiment is shown as being implemented within the analysis and visualization tool 104, in other embodiments the clustering module 120 can be implemented at least in part externally to the analysis and visualization tool. For example, module 120 can be implemented in a related system, such as a cluster labeling system or a content inference system.

The structured data field selection interface 122 of the analysis and visualization tool 104 is configured to permit selection of one or more of the structured data fields of the structured service event data.

The structured data text search interface 124 of the analysis and visualization tool 104 is configured to permit text search of the structured data.

The structured data field selection interface 122 and the structured data text search interface 124 in the present embodiment may be viewed as collectively comprising an example of what is more generally referred to herein as an "interface." Thus, elements 122 and 124 may represent different portions of a single interface, or separate interfaces. Also, a wide variety of other interface arrangements can be used in other embodiments.

The visualization module 130 of the analysis and visualization tool 104 is configured to generate at least one visualization as a function of the one or more structured data fields selected via the structured data field selection interface 122 and particular ones of the cluster topics that relate to the selected one or more structured data fields.

By way of example, selection of the one or more structured data fields via the structured data field selection interface 122 activates a structured data filter of the analysis and visualization tool 104 which adapts at least one visualization in accordance with the selected one or more structured data fields.

The visualization module 130 in the present embodiment comprises a topic view generator 132 configured to generate a topic view visualization for the one or more structured data fields selected via the structured data field selection interface 122, and a combined topic and structured data field view generator configured to generate a combined topic and structured data field visualization for the selected one or more structured data fields.

The topic view visualization generated by the view generator 132 of the visualization module 130 illustratively comprises, for example, a topic histogram indicating a number of documents for each of a plurality of topics that relate to the one or more selected structured data fields.

As another example, the topic view visualization may comprise at least one of a unigram view illustrating frequencies of respective topics in the selected one or more structured data fields and a bigram view illustrating frequencies of respective pairs of topics in the selected one or more structured data fields.

The combined topic and structured data field view visualization generated by the view generator 134 of the visualization module 130 illustratively comprises, for example, a topic histogram indicating a frequency of topic occurrence for each of a plurality of possible values of a given selected structured data field. The given selected structured data field may comprise a problem code field, a location field, a date field or other types of fields of the structured service event data.

One or more visualizations generated by the view generators 132 and 134 of the visualization module 130 can be modified based on results of a text search implemented using the structured data text search interface 124. For example, utilization of the text search via the interface 124 can activate a text search filter of the analysis and visualization tool 104 which adapts one or more of the visualizations in accordance with text entered in a text search field of the interface 124.

The analysis and visualization tool 104 can include additional or alternative components in other embodiments. For example, the analysis and visualization tool can include a labeling interface permitting user entry of a label for a selected cluster. In addition, the analysis and visualization tool 104 can be configured to update the service events database 114 to indicate a given user-entered label for the selected cluster.

It should be noted that different arrangements of one or more view generators can be used in other embodiments. For example, in possible alternative embodiments, the visualization module 130 illustratively comprises only the topic view generator 132 or only the combined topic and structured data field view generator 134.

Also, a wide variety of additional or alternative view generators can be used in the visualization module 130 in other embodiments, such as, for example, a bigram view generator configured to provide a visualization of a plurality of term pairs from a selected cluster, a summarization view generator configured to provide a visualization of representative term sequences from the selected cluster, and unigram and aggregate probability view generator configured to provide a visualization of a plurality of individual terms from the selected cluster with the aggregate probability comprising a combination of individual probabilities that respective ones of the terms appear in the selected cluster.

The individual terms may comprise respective words, the term pairs may comprise respective word pairs, and the term sequences may comprise respective sentences each having three or more words. However, other types of terms, term pairs and term sequences can be used in other embodiments. Also, phraseology such as "word" and "sentence" as used herein is intended to be broadly construed, and should not be viewed as requiring strict conformance to particular languages, grammatical constructs, etc.

The above-noted bigram view generator is illustratively configured to order the term pairs from the selected cluster based at least in part on pointwise mutual information (PMI) gain. As a more particular example, the bigram view generator can initially order the term pairs based on PMI gain and then reorder the ordered term pairs based on frequency of occurrence in the selected cluster.

The above-noted summarization view generator is illustratively configured to identify the representative term sequences from the selected cluster using an automatic summarization algorithm. Examples of automatic summarization algorithms that may be used in generating the summarization visualization include SumBasic, BayesSum and Classy.

Additional details regarding these and other exemplary summarization techniques suitable for use in embodiments of the invention are disclosed in, for example, A. Nenkova et al., "The Impact of Frequency on Summarization," MSR-TR-2005-101, 2005; H. Daume et al., "Bayesian Query-Focused Summarization," Proceedings of the 21st International Conference on Computational Linguistics, Sydney, Australia, July 2006, pp. 305-312; J. M. Conroy et al., "CLASSY Query-Based Multi-Document Summarization," Proceedings of the Document Understanding Conf. Wksp. 2005 (DUC 2005) at the Human Language Technology Conf./Conf. on Empirical Methods in Natural Language Processing (HLT/EMNLP); T. Baumel et al., "Query-Chain Focused Summarization," ACL (1) 2014: 913-922; and G. Erkan et al., "LexRank: Graph-based Lexical Centrality as Salience in Text Summarization," Journal of Artificial Intelligence Research (JAIR) 22.1 (2004): 457-479, which are incorporated by reference herein.

The analysis and visualization tool 104 can include one or more additional modules, such as a preprocessing module for applying preprocessing operations such as data indexing and dictionary generation to unstructured text data. Alternatively, such a preprocessing module can be implemented in a related content inference system that incorporates or is otherwise associated with the analysis and visualization tool or a corresponding cluster labeling system.

By way of example, a preprocessing module of the type described above illustratively comprises a data indexer and a dictionary generator.

The data indexer is configured to process unstructured text data of one or more documents obtained from the service events database 114 in order to construct a term index for at least a given one of the documents. The unstructured text data illustratively comprises unstructured service request summaries, such as problem summaries and corresponding solution summaries, relating to service events. In some embodiments, the unstructured text data has structured data associated therewith in the service events database 114 and the term index is based on both the unstructured text data and the associated structured data. Examples of structured data include indications of region, team, etc.

The dictionary generator is configured to process one or more term indexes generated by the data indexer in order to construct one or more in-domain dictionaries. In this context, the term "in-domain" refers to a domain comprising specified unstructured text data of one or more documents, although other types of domains can be used in other embodiments. The dictionary generator is illustratively configured to implement automatic lemmatization and synonym extraction, but in other embodiments different types of dictionary generators may be used.

Additional details regarding exemplary dictionary generation techniques that may be utilized in embodiments of the present invention can be found in R. Cohen, "Towards Understanding of Medical Hebrew," Dissertation, Ben-Gurion University of the Negev, 2012; P. F. Brown et al., "Class-based n-gram models of natural language," Computational Linguistics 18.4 (1992): 467-479; and S. Banerjee et al., "The design, implementation, and use of the ngram statistics package," Computational Linguistics and Intelligent Text Processing 2003:370-381, which are incorporated by reference herein.

As mentioned above, the analysis and visualization tool 104 can include or be otherwise associated with a topic model generator. The topic model generator may be configured to process one or more in-domain dictionaries in order to construct at least one topic model. In the present embodiment, it is assumed that the topic model generator in generating the topic model utilizes latent Dirichlet allocation (LDA) with asymmetric priors, although other techniques can be used, including, for example, probabilistic latent semantic analysis (pLSA), canonical-correlation analysis (CCA), or combinations of these and other topic modeling algorithms. The topic model generator illustratively provides lists of topics at least a subset of which are elevated as respective sets of related terms from the unstructured text data.

Examples of topic modeling algorithms suitable for use in the analysis and visualization tool 104 in embodiments of the present invention are disclosed in, for example, R. Cohen et al., "Redundancy in electronic health record corpora: analysis, impact on text mining performance and mitigation strategies," BMC Bioinformatics 2013, 14:10; D. M. Blei et al., "Latent dirichlet allocation," The Journal of Machine Learning Research 2003, 3:993-1022; A. K. McCallum, "Mallet: A machine learning for language toolkit," 2002; and H. Wallach et al., "Rethinking LDA: Why priors matter," Advances in Neural Information Processing Systems 2009, 22:1973-1981, which are incorporated by reference herein.

The visualization module 130 is configured to provide an output display showing at least a subset of the various visualizations generated by the view generators 132 and 134, as well as any additional or alternative visualizations. The output display illustratively comprises one of a plurality of user interface displays that are generated under the control of the visualization module 130 and presented on a display screen of a user device not explicitly shown in the system 100 of FIG. 1. For example, such a user device may comprise a computer, mobile telephone or other type of processing device adapted for communication with the analysis and visualization tool 104 over the network 106.

The service events database 114 may be updated to indicate the assignment of one or more topics to a given document. Such a topic assignment is an example of what is more generally referred to herein as a "content inference." As mentioned previously, the analysis and visualization tool 104 in some embodiments is incorporated in or otherwise associated with a content inference system.

The analysis and visualization tool 104 is advantageously data driven in that relevant topics are elevated automatically from the actual unstructured text data itself rather than determined by attempting to impose a limited set of predefined themes on the unstructured text data. This provides significant improvements in unstructured text data analysis and visualization relative to the conventional approaches previously described. For example, resulting topic distributions and associated visualizations can be used to identify sets of documents sharing semantic similarity.

The analysis and visualization tool 104 considerably facilitates text data exploration in large volumes of unstructured text data, and in particular the problem and resolution summaries that are common to service requests. It enables analysts to quickly obtain content inferences from multiple sets of unstructured text data, and to determine appropriate labels for clusters of corresponding documents.

The analysis and visualization tool 104 in the illustrative embodiments does not characterize individual system users but instead models unstructured text data of one or more documents from the service events database 114. By way of example, such an arrangement allows particularly efficient analysis and visualization of overall customer interactions with a corporate or enterprise support organization.

It is to be appreciated that the particular arrangement of system components illustrated in FIG. 1 is exemplary only, and that numerous other arrangements of components may be used in other embodiments. For example, in other embodiments, functionality described herein as being associated with one or more of the clustering module 120, interfaces 122 and 124 and visualization module 130 may be implemented at least in part using additional or alternative components of the system 100.

The analysis and visualization tool 104, and possibly other related components of system 100 such as the service events database 114, are assumed in the present embodiment to be implemented on a given processing platform using at least one processing device comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, or a wide variety of other types of computer program products. The term "article of manufacture" as used herein is intended to be broadly construed, but should be understood to exclude transitory, propagating signals.

The one or more processing devices implementing the analysis and visualization tool 104, and possibly other components of system 100, may each further include a network interface that allows such components to communicate with one another over one or more networks. For example, a given such network interface illustratively comprises network interface circuitry that allows at least one of the modules 120 and 130 to communicate over a network with other components of the system 100 such as servers 102, service events database 114 and data management system 116. Such network interface circuitry may comprise, for example, one or more conventional transceivers.

The above-noted network may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

At least a portion of the analysis and visualization tool 104, and possibly other system components, may comprise software that is stored in a memory and executed by a processor of at least one processing device.

Processing devices comprising processors, memories and network interfaces as described above are illustratively part of a processing platform comprising physical and virtual resources in any combination. Additional examples of such processing platforms that may be used to implement at least portions of the system 100 will be described in more detail below in conjunction with FIGS. 11 and 12.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations. Examples of other system embodiments will be described below in conjunction with FIGS. 3 and 10.

The operation of the information processing system 100 will now be further described with reference to the flow diagram of FIG. 2, which illustrates an exemplary process carried out by the system 100 in one embodiment. The process as shown includes steps 200 through 208. Steps 200 through 208 are assumed to be performed by the analysis and visualization tool 104, but one or more of these steps may be performed at least in part by or in conjunction with other system components in other embodiments. Moreover, analysis and visualization functionality as disclosed herein should not be viewed as being limited in any way to this particular illustrative arrangement of process steps.

In step 200, structured service event data is obtained. The structured service event data comprises service event data stored in one or more structured data fields of the service events database 114.

In step 202, unstructured service event data is obtained. The unstructured service event data includes documents comprising unstructured text data of the service events database 114.

As mentioned previously, various preprocessing steps may be applied to the unstructured text data. For example, one or more term indexes may be constructed, possibly in the form of a document term matrix, or in another suitable format. Also, associated structured data may be taken into account in generating the one or more term indexes. One or more in-domain dictionaries may then be constructed based on the term index, possibly using automatic lemmatization and synonym extraction.

In step 204, each of the documents is assigned to one or more of a plurality of clusters corresponding to respective topics. The topics may be identified from the unstructured text data using one or more topic models. Such topic models can be constructed by a topic model generator of the clustering module 120 or by an associated cluster labeling system or content inference system. By way of example, a given such topic model can be constructed based on one or more of the above-noted in-domain dictionaries, possibly using LDA with asymmetric priors. Additionally or alternatively, one or more other topic modeling algorithms such as pLSA or CCA may be used.

It is possible in this illustrative embodiment that a given document can be assigned to multiple clusters, such as two or three different clusters. The clusters in this embodiment are therefore examples of what are referred to herein as "soft" clusters. In other embodiments, the analysis and visualization tool 104 may be configured in some modes of operation such that each document can only be assigned to a single cluster, resulting in what are referred to herein as "hard" clusters.

In step 206, an interface of the analysis and visualization tool is utilized to permit selection of one or more of the structured data fields. This interface in the context of the FIG. 1 embodiment corresponds to the structured data field selection interface 122.

In step 208, the analysis and visualization tool generates at least one visualization as a function of the one or more structured data fields selected in step 206 and particular ones of the cluster topics that relate to the selected structured data field or fields. Such visualizations can be used to facilitate a variety of different types of analysis, including root cause analysis and cost driver identification.

Examples of visualizations that may be generated in step 208 of the FIG. 2 process will be described below in conjunction with FIGS. 4 through 9. However, it is to be appreciated that numerous other types of visualizations may be generated from structured and unstructured service event data, including a contrastive topic visualization for multiple topics corresponding to the clusters, a bigram visualization, a summarization visualization and a unigram and aggregate probability visualization.

Steps 200 through 208 can be repeated periodically or as needed to process additional structured and unstructured service event data from the service events database 114.

Figure 2:
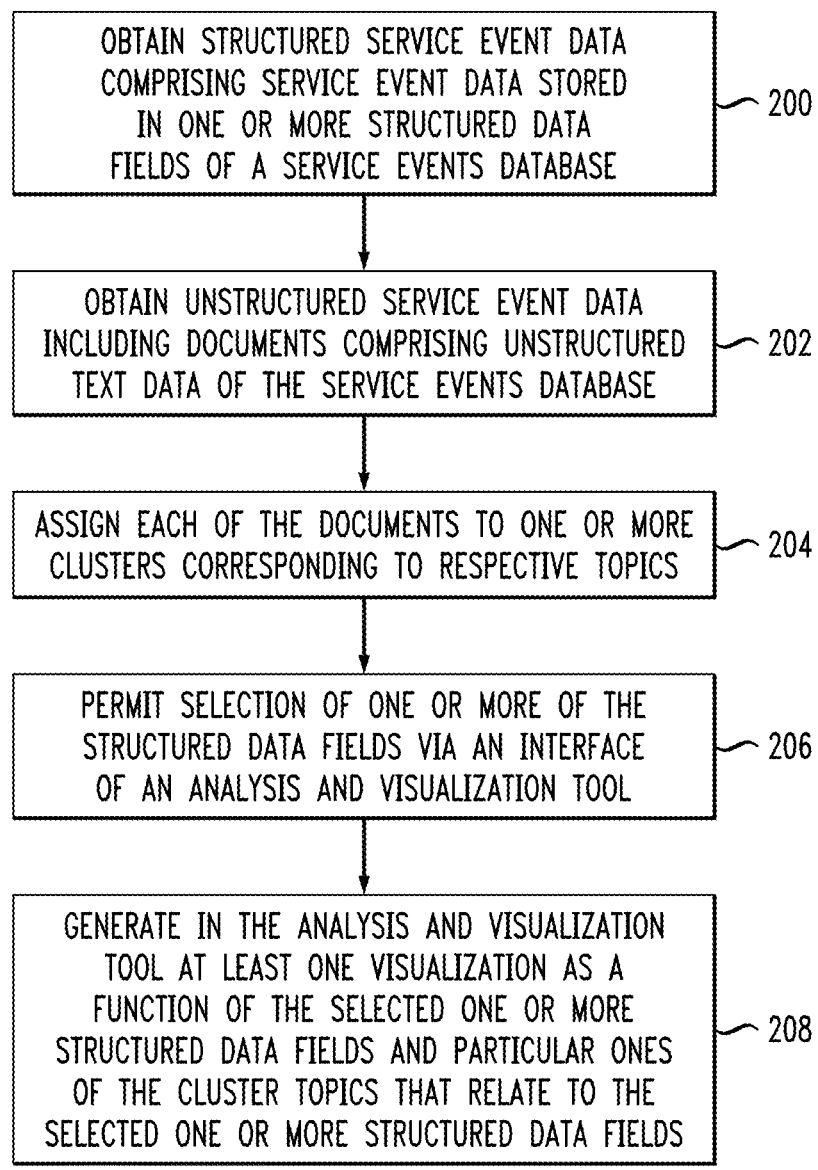
FIG. 2 is a flow diagram of an exemplary process implemented in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing an analysis and visualization tool or portions thereof. For example, the ordering of the process steps may be varied in other embodiments, or certain steps may be performed concurrently with one another rather than serially.

It is to be appreciated that analysis and visualization functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

In addition, as noted above, the configuration of information processing system 100 is exemplary only, and numerous other system configurations can be used in implementing an analysis and visualization tool as disclosed herein.

Figure 3:
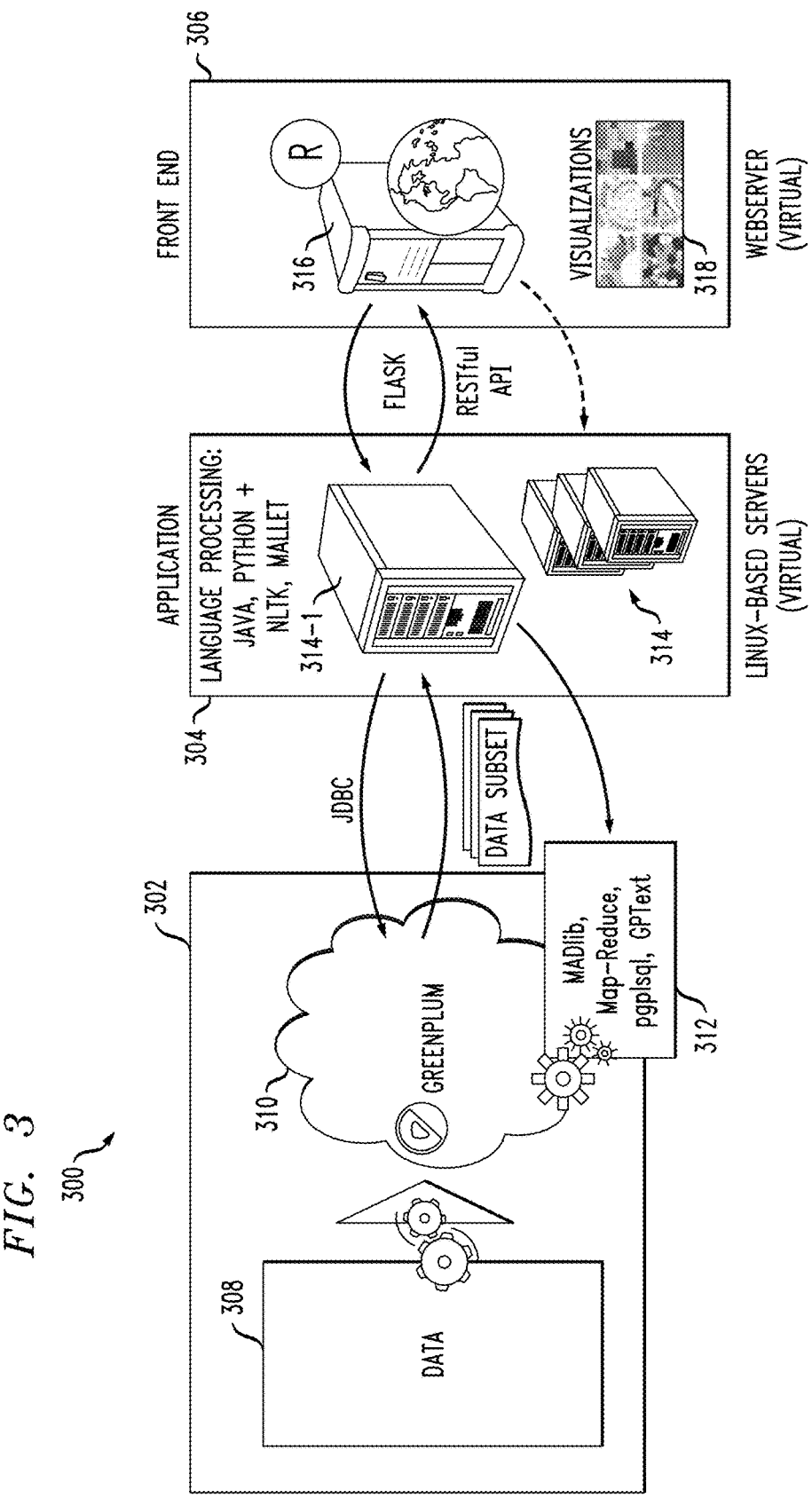
FIG. 3 shows another illustrative embodiment of an information processing system configured to include an analysis and visualization tool.

FIG. 3 shows another example of an information processing system 300 that implements an analysis and visualization tool in an illustrative embodiment. The system 300 comprises a data layer portion 302, an application portion 304 and a front end portion 306. The data layer portion 302 comprises data 308 that is processed by an analytics system 310 illustratively implemented as a Greenplum® system. Additional functional elements 312 illustratively include a plurality of elements for implementing respective MADlib, Map-Reduce, pgplsql and GPText functionality. These elements interact with the analytics system 310 with input from the application portion 304.

The application portion 304 comprises a set of Linux-based servers 314 illustratively implemented using virtual machines. These include a Linux-based server 314-1 that performs language processing using Java, Python Natural Language Toolkit (NLTK) and Mallet. The server 314-1 interacts with the analytics system 310 via Java DataBase Connectivity (JDBC) and receives data subsets therefrom as illustrated.

The front end portion 306 comprises a web server 316 also illustratively implemented using one or more virtual machines and includes a user interface 318 providing visualizations of the type described elsewhere herein. The web server 316 communicates with the server 314-1 via Flask and a RESTful API as illustrated, and may additionally or alternatively communicate with one or more other servers 314 of the application portion 304 via additional connections shown by a dashed arrow in the figure.

The various portions of system 300 are adapted in the present embodiment to implement the functionality of the analysis and visualization tool 104 as previously described. This particular system configuration is only an example, and numerous other arrangements of system components can be used to provide that functionality.

As indicated previously, examples of user interface displays generated by an analysis and visualization tool in illustrative embodiments will now be described with reference to FIGS. 4 through 9.

Figure 4:
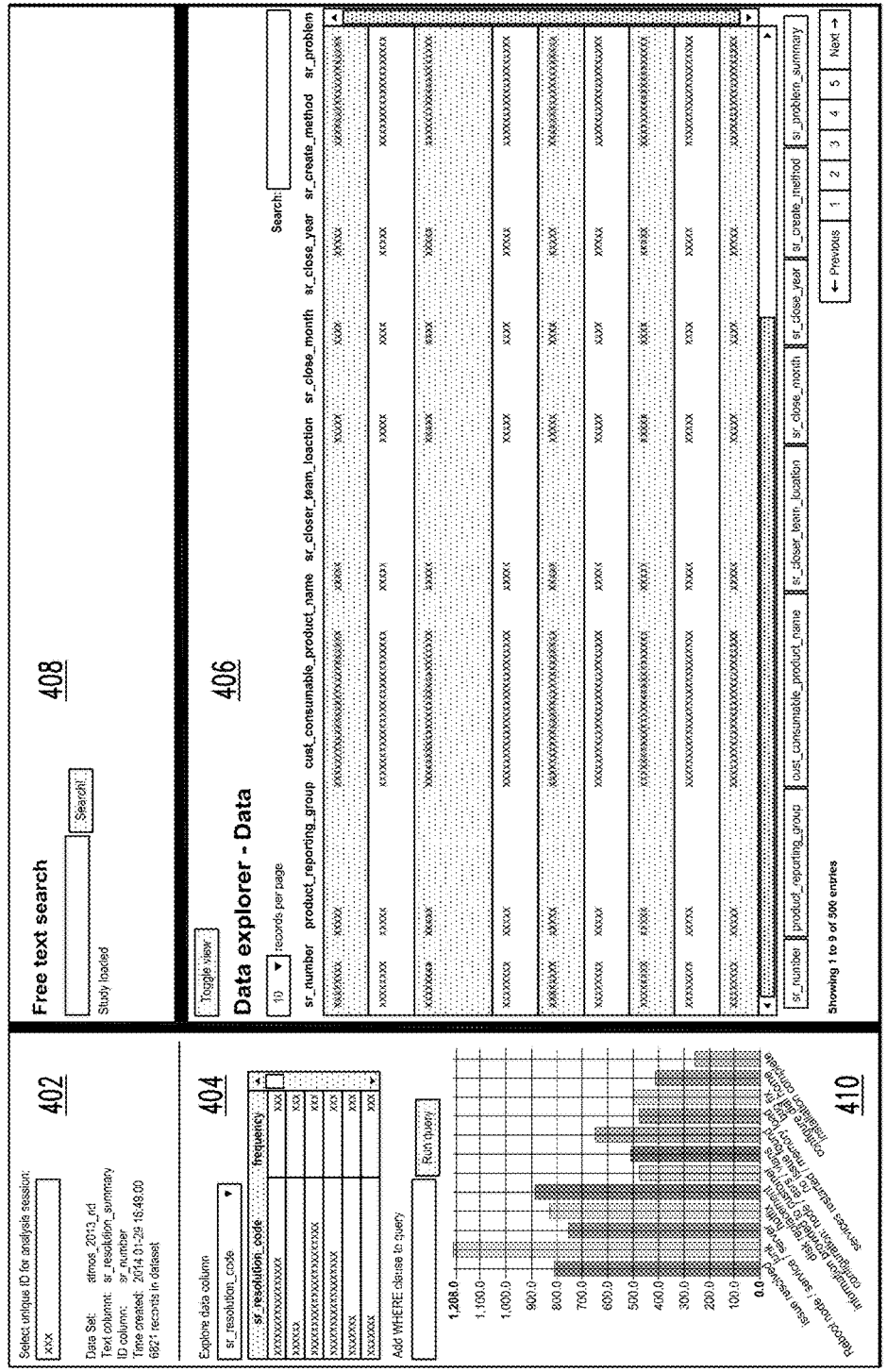

Referring initially to FIG. 4, an exemplary user interface display 400 generated by the analysis and visualization tool 104 is shown. The user interface display 400 is assumed to be one of a plurality of different user interface displays that are generated by the analysis and visualization tool 104. As shown in the figure, the user interface display 400 includes a session selection panel 402, a structured data field selection panel 404, a data explorer panel 406, a structured data text search panel 408, and a visualization 410.

The session selection panel 402 is configured to allow a user to select a unique identifier for a given analysis session performed using the analysis and visualization tool. The tool can then store analysis results, visualizations or other output information under the unique identifier of the analysis session.

The data explorer panel 406 displays data records associated with a particular structured data field name entered in the structured data field selection panel 404. For example, in this example, the structured data field sr_resolution_code is entered in the panel 404, and corresponding records are displayed in the data explorer panel 406. The structured data field sr_resolution_code generally denotes a field that includes a code indicative of a particular resolution for a service request.

The visualization 410 in this example comprises a topic histogram indicating the number of documents for each of a plurality of topics that relate to the selected structured data field sr_resolution_code. A topic histogram of this type is an example of a topic view visualization that is generated by the topic view generator 132 of the visualization module 130 for a selected structured data field.

Accordingly, in the present embodiment, selection of the structured data field sr_resolution_code via the panel 404 activates a structured data filter of the analysis and visualization tool 104 which adapts the visualization 410 in accordance with the selected structured data field.

The structured data text search panel 408 of the user interface display 400 is not utilized in this example, but serves to permit the user to perform text search of the structured data, with at least one generated visualization being modified based on a result of the text search. For example, utilization of the text search via the panel 408 can activate a text search filter of the analysis and visualization tool 104 which adapts the visualization 410 in accordance with text entered in the text search field of the panel 408.

Figure 5:
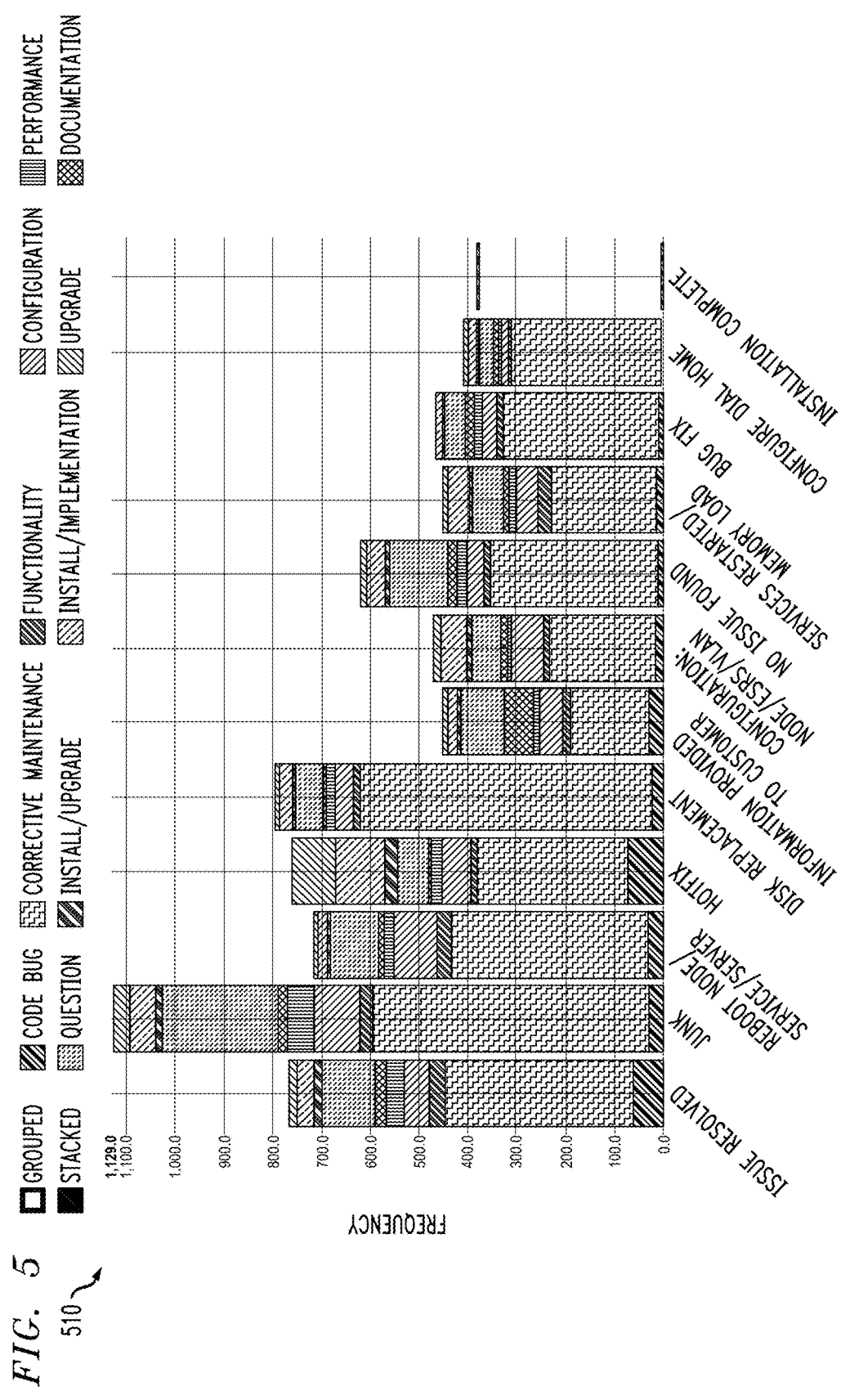
Figure 6:
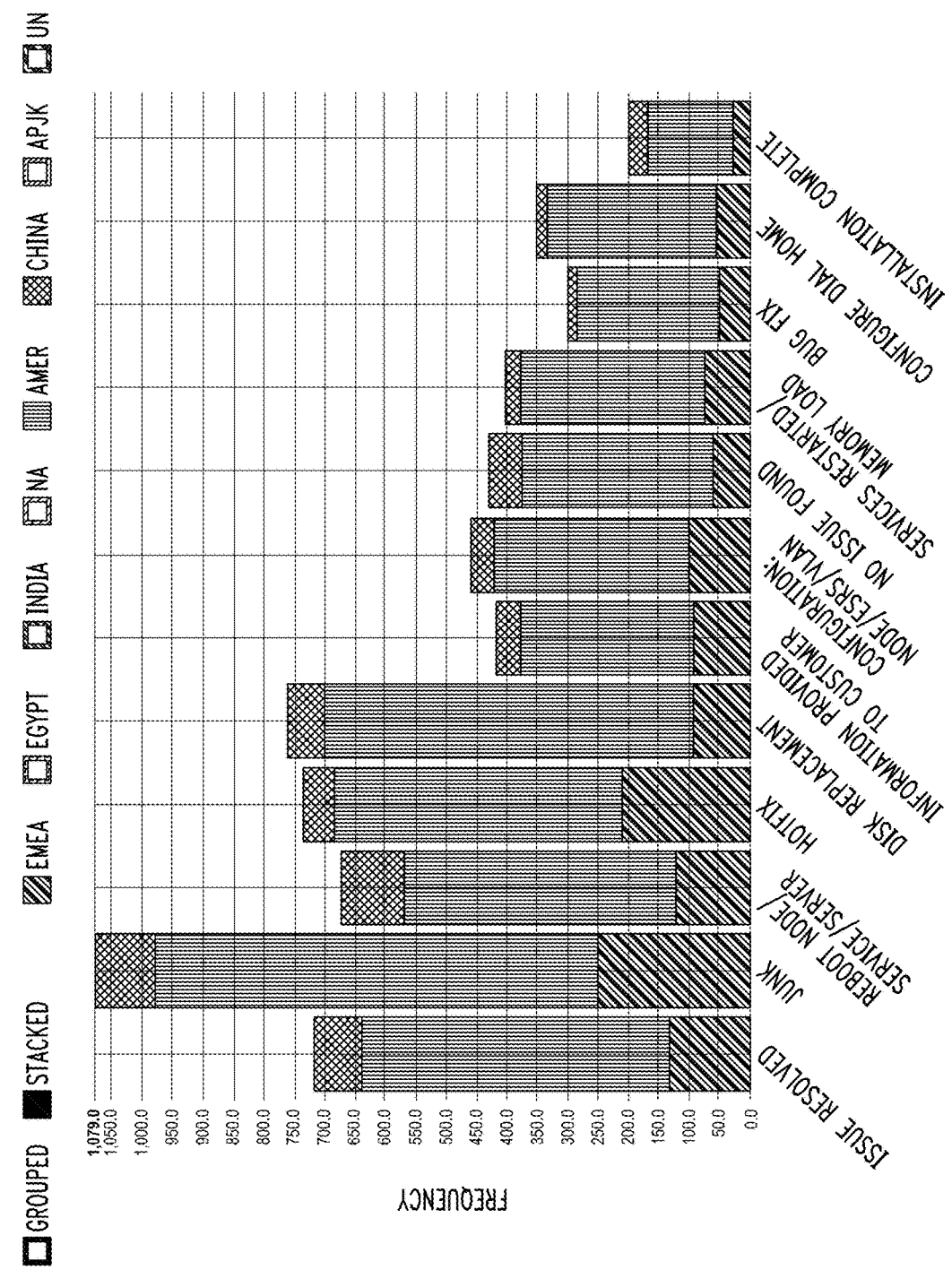

FIGS. 5 and 6 illustrate additional user interface displays showing respective visualizations 510 and 610 generated by the visualization module 130 of the analysis and visualization tool 104. These visualizations are examples of what are also referred to herein as combined topic and structured data field view visualizations for one or more selected structured data fields. More particularly, in each of these examples, the combined topic and structured data field view visualization comprises a topic histogram indicating a frequency of topic occurrence for each of a plurality of possible values of a given selected structured data field.

The selected structured data field for the visualization 510 is problem code, and the selected structured data field for the visualization 610 is location. Accordingly, these visualizations show respective topic distributions for the problem code and location structured data fields. Such visualizations provide a dynamic histogram view of cluster topics with respect to the values of a selected structured data field, and can provide insights that would not otherwise be apparent using conventional approaches.

Figure 7:
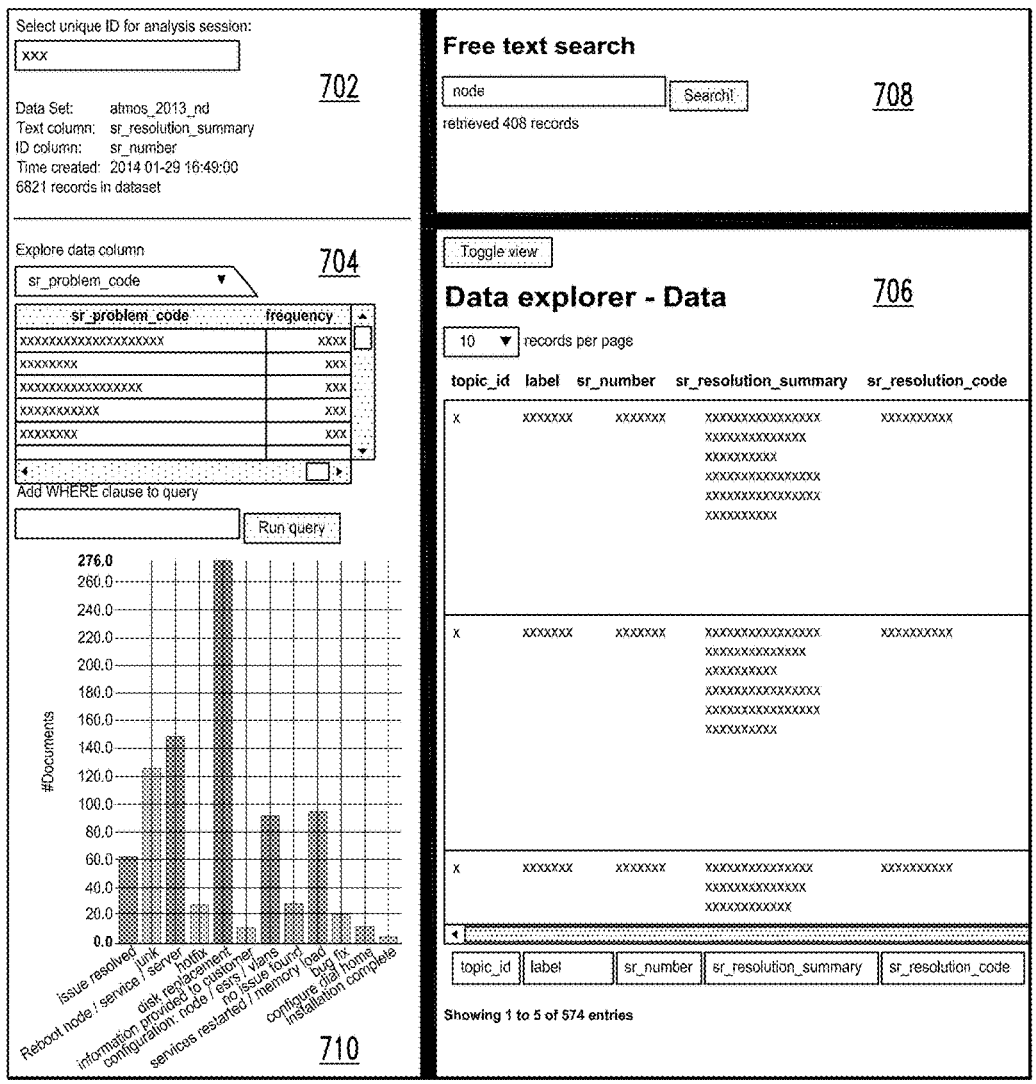

FIG. 7 shows an additional user interface display 700 generated by the analysis and visualization tool 104 in an illustrative embodiment. The display 700 is similar to the display 400 as previously described, and includes a session selection panel 702, a structured data field selection panel 704, a data explorer panel 706, a structured data text search panel 708, and a visualization 710.

However, in this example the text search term "node" is entered in the structured data text search panel 708, and the visualization 710 and the records displayed in the data explorer panel 706 are suitably modified based on results of the text search. More particularly, the utilization of the text search feature via the panel 708 activates a text search filter of the analysis and visualization tool 104 which adapts the visualization 710 in accordance with the entered text search term.

Also, in this example the structured data field selected in the panel 704 is a service request problem code denoted sr_problem_code. Accordingly, the generated visualization 710 comprises a topic histogram indicating the number of documents for each of a plurality of topics that relate to the selected structured data field sr_problem code.

Figure 8:
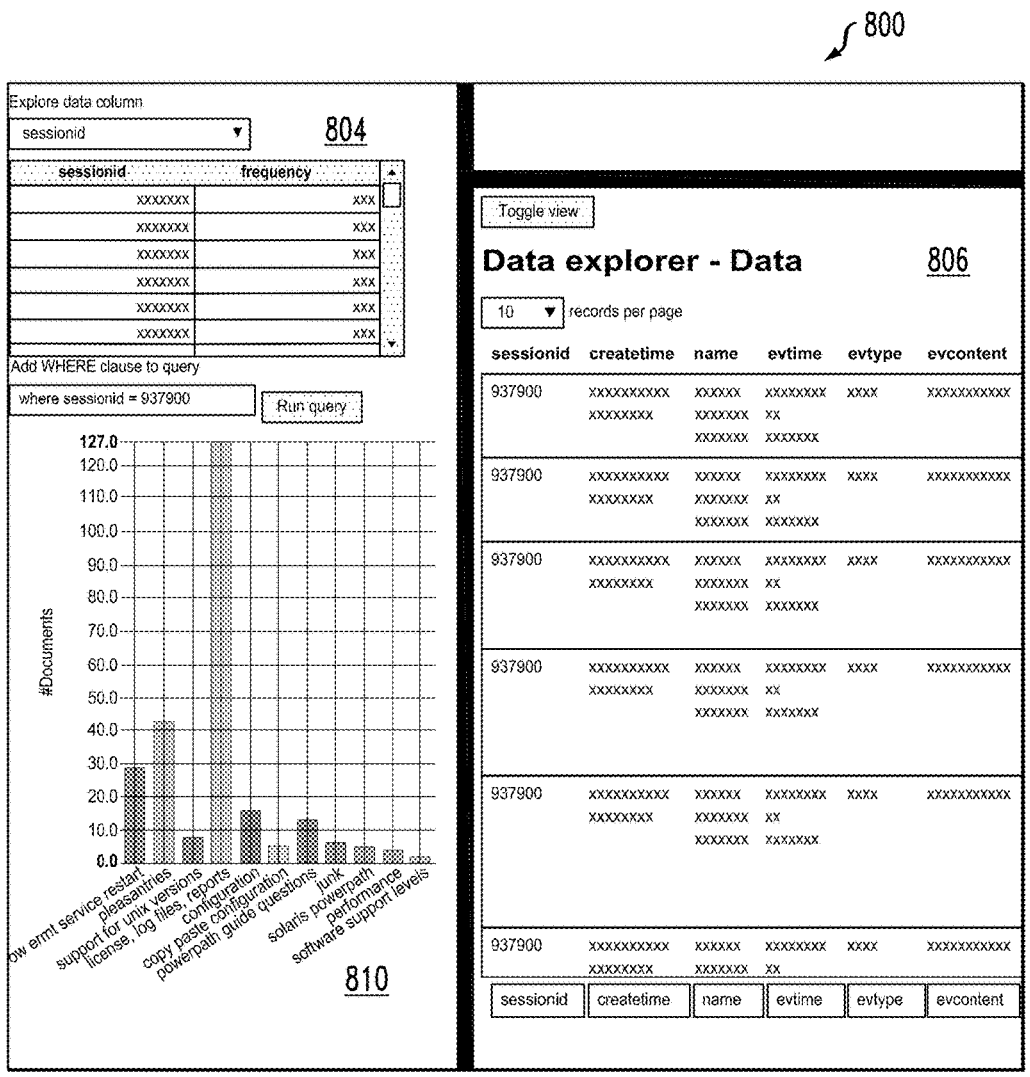
Figure 9:
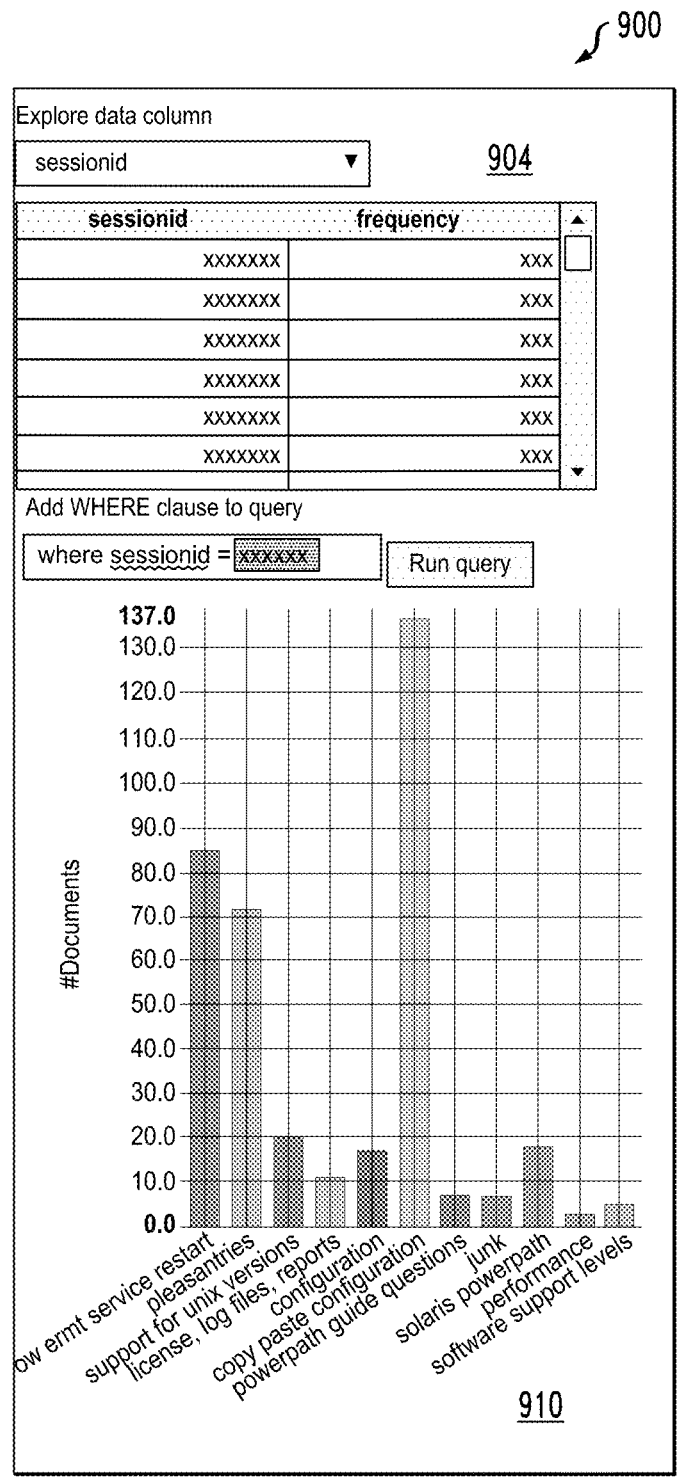

Additional user display interfaces 800 and 900 similar to the display 400 or 700 are shown in respective FIGS. 8 and 9.

In FIG. 8, the structured data field selected via structured data field selection panel 804 is a session identifier field, and the records are further restricted via user entry of a particular session identifier, in this case session identifier 937900. The records displayed in data explorer panel 806 and the topic histogram 810 are modified in accordance with the structured data field entries made via the panel 804.

FIG. 9 illustrates modification of a visualization 910 based on selection of a different session identifier via a structured data field selection panel 904.

It is apparent that arrangements such as those shown in FIGS. 8 and 9 allow the user to focus in on chat transcript analysis, analyzing an identified chat session and identifying the particular topics associated with the chat session.

It should be understood that the particular user interface displays illustrated in FIGS. 4 through 9 are presented by way of example only, and should not be construed as limiting the scope or functionality of the analysis and visualization tool 104 in any way.

As mentioned previously, the system embodiments of FIGS. 1 and 3 are presented by way of example only. Numerous other configurations and arrangements of components can be used to implement an analysis and visualization tool.

Figure 10:
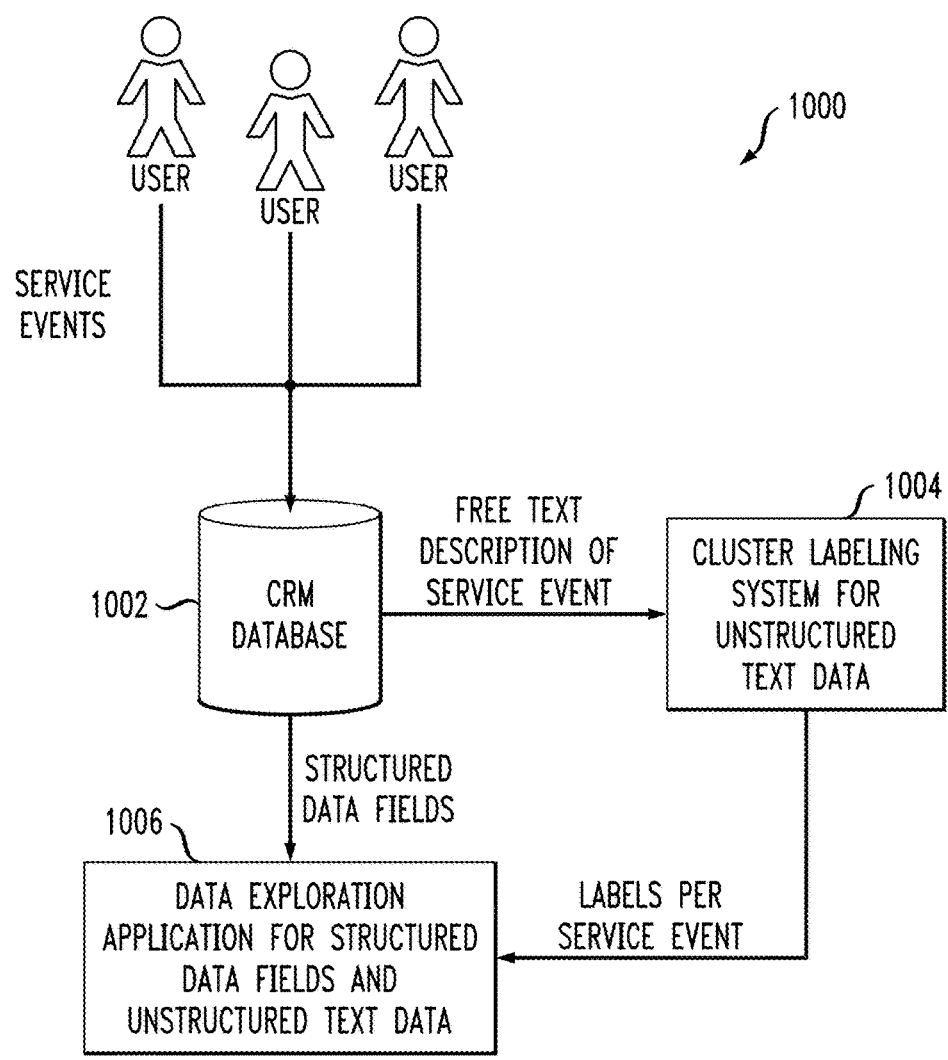
FIG. 10 shows another embodiment of an information processing system that implements an analysis and visualization tool for structured and unstructured service event data.

Another illustrative embodiment of an information processing system that implements an analysis and visualization tool for structured and unstructured service event data is shown in FIG. 10. In this embodiment, system 1000 comprises a customer relationship management (CRM) database 1002. The CRM database may be viewed as an example of what is more generally referred to herein as a "service events database." The CRM database 1002 is assumed to comprise both structured and unstructured service event data relating to service events involving system users.

The analysis and visualization tool in this embodiment comprises a cluster labeling system 1004 and a data exploration application 1006, both coupled to the CRM database 1002. The cluster labeling system 1004 receives free text descriptions of service events from the CRM database 1002. These free text descriptions are examples of what are more generally referred to herein as documents comprising unstructured text data. Such documents are considered a type of unstructured service event data. The cluster labeling system 1004 assigns one or more labels to each of the service event descriptions. Each such label corresponds to a different topic, such that the labeling process serves to relate service event descriptions dealing with the same topic into corresponding clusters.

The resulting labels indicative of respective cluster topics for the free text service event descriptions are provided by the cluster labeling system 1004 to the data exploration application 1006. The data exploration application 1006 also receives structured service event data. This structured service event data illustratively comprises data stored in one or more structured data fields of a service events database. The data exploration application 1006 is assumed to comprise an interface for permitting selection of at least one of the structured data fields, and a visualization module configured to generate at least one visualization as a function of the selected structured data field or fields and particular ones of the cluster topics that relate to the selected structured data field or fields.

The illustrative embodiments provide a number of significant advantages relative to conventional arrangements. For example, these embodiments provide particularly efficient combined processing of structured and unstructured service event data for enhanced analysis and visualization. User interface displays such as those illustrated in FIGS. 4 through 9 provide detailed insights into the particular service events that are handled within a given system.

An analysis and visualization tool in some embodiments provides extended views combining one or more structured data fields of structured service event data with cluster topics derived from unstructured text data of unstructured service event data. A given such tool comprises one or more interfaces that illustratively facilitate exploration of service event data including an ability to zoom in on particular unstructured text documents corresponding to one or more selected structured data fields as well as an ability to aggregate multiple unstructured text documents into a single visualization.

As indicated previously, the analysis and visualization tools in the illustrative embodiments are data driven in that relevant topics are elevated automatically from the actual unstructured text data itself rather than determined by attempting to impose a limited set of predefined themes on the unstructured text data.

The illustrative embodiments therefore advantageously avoid the need for manual screening in which a corpus of unstructured text data is reviewed and sampled by service personnel.

Furthermore, there is no need for manual customization and maintenance of a large set of rules that can be used to determine correspondence with predefined themes of interest. For example, the illustrative embodiments do not require rule updates to accommodate previously unseen terms appearing in unstructured text data.

In addition, analysis and visualization tools as disclosed herein can provide significant insights into relationships between structured and unstructured service event data in a very short period of time. Particular studies can be configured and executed quickly, with large quantities of analysis output being available almost immediately. Also, such studies can be easily reconfigured and repeated as needed using different sets of parameters.

It is to be appreciated that the foregoing advantages are illustrative of advantages provided in certain embodiments, and need not be present in other embodiments.

It was noted above that portions of the information processing system 100 may be implemented using one or more processing platforms. A given such processing platform comprises at least one processing device comprising a processor coupled to a memory, and the processing device may be implemented at least in part utilizing one or more virtual machines, containers or other virtualization infrastructure.

Illustrative embodiments of such platforms will now be described in greater detail. Although described in the context of system 100, these processing platforms may also be used to implement at least portions of other information processing systems in other embodiments of the invention, such as the information processing system 300 of FIG. 3 and the information processing system 1000 of FIG. 10.

Figure 11:
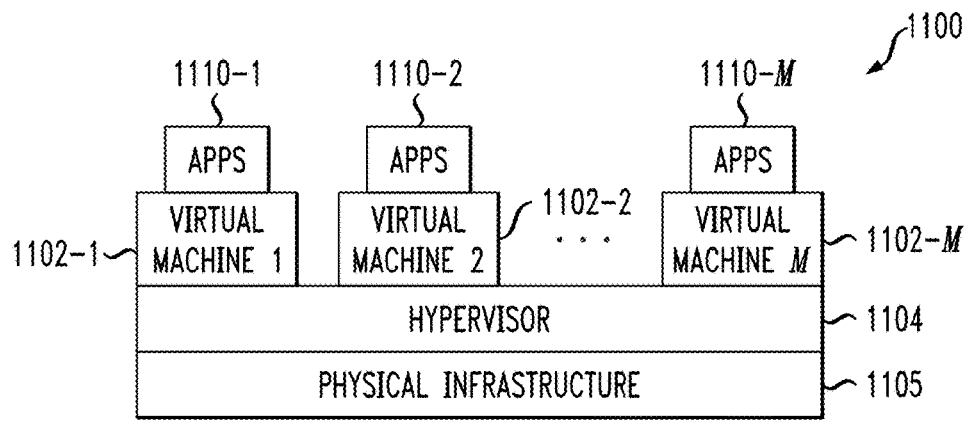
FIGS. 11 and 12 show examples of processing platforms that may be utilized to implement at least a portion of one or more of the information processing systems of FIGS. 1, 3 and 10.

As shown in FIG. 11, portions of the information processing system 100 may comprise cloud infrastructure 1100. The cloud infrastructure 1100 comprises virtual machines (VMs) 1102-1, 1102-2, . . . 1102-M implemented using a hypervisor 1104. The hypervisor 1104 runs on physical infrastructure 1105. The cloud infrastructure 1100 further comprises sets of applications 1110-1, 1110-2, . . . 1110-M running on respective ones of the virtual machines 1102-1, 1102-2, . . . 1102-M under the control of the hypervisor 1104.

Although only a single hypervisor 1104 is shown in the embodiment of FIG. 11, the system 100 may of course include multiple hypervisors each providing a set of virtual machines using at least one underlying physical machine. For example, different sets of virtual machines provided by respective ones of multiple hypervisors may be utilized in configuring multiple instances of clustering module 120, visualization module 130 or other components of the system 100.

An example of a commercially available hypervisor platform that may be used to implement hypervisor 1104 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system 100.

The cloud infrastructure 1100 in FIG. 11 can additionally or alternatively be implemented using other types of virtualization techniques, such as Docker containers or other types of containers.

Figure 12:
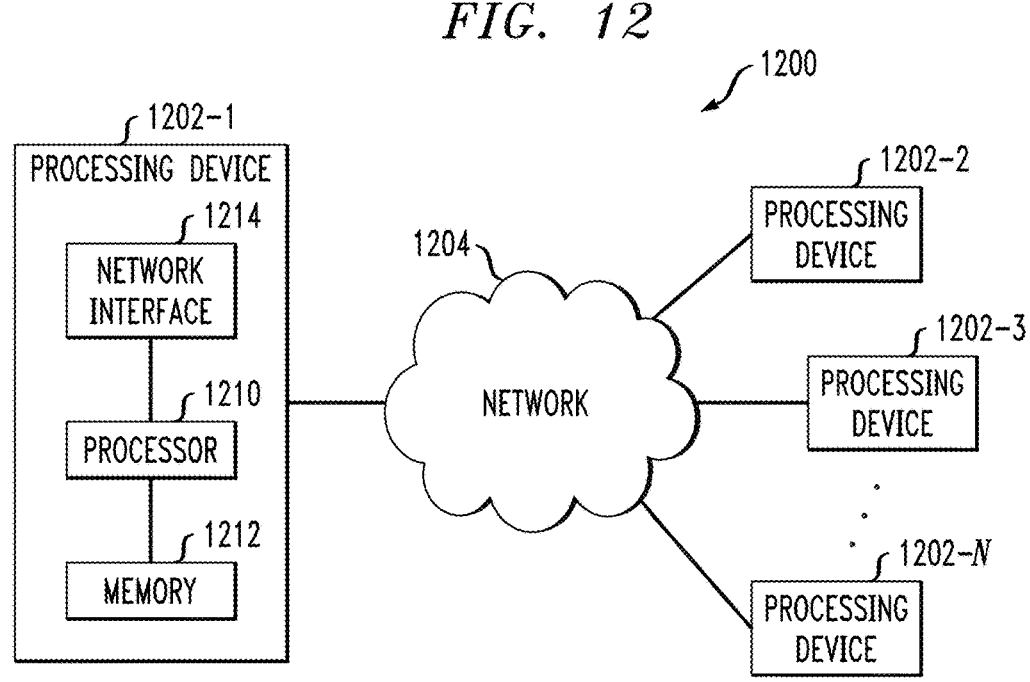

Another example of a processing platform suitable for use in some embodiments is processing platform 1200 shown in FIG. 12. The processing platform 1200 in this embodiment is assumed to comprise at least a portion of system 100 and includes a plurality of processing devices, denoted 1202-1, 1202-2, 1202-3, . . . 1202-N, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an ASIC, an FPGA, or other type of processing circuitry, as well as portions or combinations of such circuitry elements.

The memory 1212 may comprise RAM, ROM or other types of memory, in any combination. As mentioned previously, the memory 1212 and other memories disclosed herein should be viewed as illustrative examples of what are more generally referred to as "processor-readable storage media" storing executable program code of one or more software programs, and articles of manufacture comprising such processor-readable storage media are considered embodiments of the present invention.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, and other components. In addition, the particular modules, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
a processing platform comprising one or more processing devices each comprising a processor coupled to a memory, the processing platform being configured for combined processing of structured and unstructured service event data;
the structured service event data comprising service event data stored in one or more structured data fields of a service events database;
the unstructured service event data including documents comprising unstructured text data of the service events database, the unstructured service event data comprising unstructured service request summaries including one or more problem summaries and one or more corresponding solution summaries;
wherein the processing platform is configured:
to apply preprocessing to the unstructured text data by:
constructing one or more term indexes of the unstructured text data based at least in part on associations between the unstructured service request summaries and structured data in one or more of the structured data fields of the service events database;
generating, for a domain comprising the documents, one or more in-domain dictionaries utilizing the one or more term indexes;
processing the one or more in-domain dictionaries to construct a topic model; and
automatically determining at least a subset of a plurality of topics automatically utilizing the topic model, as sets of related terms from the unstructured text data, without reference to a set of rules characterizing predefined topics;
to assign each of the documents to one or more of a plurality of clusters corresponding to respective topics;
to provide an interface configured to permit selection of one or more of the structured data fields; and
to generate at least one visualization as a function of the selected one or more structured data fields and particular ones of the cluster topics that relate to the selected one or more structured data fields.

2. The apparatus of claim 1 wherein selection of the one or more structured data fields via the interface activates a structured data filter which adapts the visualization in accordance with the selected one or more structured data fields.

3. The apparatus of claim 1 wherein the interface is further configured to permit text search of the structured data and further wherein said at least one generated visualization is modified based on a result of the text search.

4. The apparatus of claim 3 wherein utilization of the text search via the interface activates a text search filter which adapts the visualization in accordance with text entered in a text search field of the interface.

5. The apparatus of claim 1 wherein the generated visualization comprises a topic view visualization for the selected one or more structured data fields.

6. The apparatus of claim 5 wherein the topic view visualization comprises a topic histogram indicating a number of documents for each of a plurality of topics that relate to the one or more selected structured data fields.

7. The apparatus of claim 5 wherein the topic view visualization comprises at least one of a unigram view illustrating frequencies of respective topics in the selected one or more structured data fields and a bigram view illustrating frequencies of respective pairs of topics in the selected one or more structured data fields.

8. The apparatus of claim 1 wherein the generated visualization comprises a combined topic and structured data field view visualization for the selected one or more structured data fields.

9. The apparatus of claim 8 wherein the combined topic and structured data field view visualization comprises a topic histogram indicating a frequency of topic occurrence for each of a plurality of possible values of a given selected structured data field.

10. The apparatus of claim 9 wherein the given selected structured data field comprises one of a problem code field, a location field and a date field.

11. An information processing system comprising the apparatus of claim 1.

12. A method comprising:
    obtaining structured service event data comprising service event data stored in one or more structured data fields of a service events database;
    obtaining unstructured service event data including documents comprising unstructured text data of the service events database, the unstructured service event data comprising unstructured service request summaries including one or more problem summaries and one or more corresponding solution summaries;
    apply preprocessing to the unstructured text data by:
        constructing one or more term indexes of the unstructured text data based at least in part on associations between the unstructured service request summaries and structured data in one or more of the structured data fields of the service events database;
        generating, for a domain comprising the documents, one or more in-domain dictionaries utilizing the one or more term indexes;
        processing the one or more in-domain dictionaries to construct a topic model; and
        automatically determining at least a subset of a plurality of topics automatically utilizing the topic model, as sets of related terms from the unstructured text data, without reference to a set of rules characterizing predefined topics;
    assigning each of the documents to one or more of a plurality of clusters corresponding to respective topics;
    permitting selection of one or more of the structured data fields via an interface; and
    generating at least one visualization as a function of the selected one or more structured data fields and particular ones of the cluster topics that relate to the selected one or more structured data fields;
    wherein said obtaining structured and unstructured service event data, assigning, permitting and generating are performed by a processing platform comprising one or more processing devices.

13. The method of claim 12 wherein generating at least one visualization comprises generating a topic view visualization for the selected one or more structured data fields.

14. The method of claim 12 wherein generating at least one visualization comprises generating a combined topic and structured data field view visualization for the selected one or more structured data fields.

15. A non-transitory processor-readable storage medium having program code of one or more software programs embodied therein, wherein the program code when executed by at least one processing device of a processing platform causes the processing device:
    to obtain structured service event data comprising service event data stored in one or more structured data fields of a service events database;
    to obtain unstructured service event data including documents comprising unstructured text data of the service events database, the unstructured service event data comprising unstructured service request summaries including one or more problem summaries and one or more corresponding solution summaries;
    to apply preprocessing to the unstructured text data by:
        constructing one or more term indexes of the unstructured text data based at least in part on associations between the unstructured service request summaries and structured data in one or more of the structured data fields of the service events database;
        generating, for a domain comprising the documents, one or more in-domain dictionaries utilizing the one or more term indexes;
        processing the one or more in-domain dictionaries to construct a topic model; and
        automatically determining at least a subset of a plurality of topics automatically utilizing the topic model, as sets of related terms from the unstructured text data, without reference to a set of rules characterizing predefined topics;
    to assign each of the documents to one or more of a plurality of clusters corresponding to respective topics;
    to permit selection of one or more of the structured data fields via an interface; and
    to generate at least one visualization as a function of the selected one or more structured data fields and particular ones of the cluster topics that relate to the selected one or more structured data fields.

16. The processor-readable storage medium of claim 15 wherein the storage medium comprises at least one of an electronic memory and a storage disk.

17. The processor-readable storage medium of claim 15 wherein the program code when executed by at least one processing device further causes said processing device:
    to generate said at least one visualization as at least one of a topic view visualization for the selected one or more structured data fields and a combined topic and structured data field view visualization for the selected one or more structured data fields.

\* \* \* \* \*